United States Patent

[11] 3,577,765

[72] Inventors Joseph Bertoglio
Collinsville, Ill.;
Philip L. Deming, St. Louis, Mo.; Joyce G. Eckert, Columbia, Ill.; James R. Shafer, Bridgeton, Mo.
[21] Appl. No. 693,211
[22] Filed Dec. 26, 1967
[45] Patented May 4, 1971
[73] Assignee Monsanto Company
St. Louis, Mo.

[54] APPARATUS FOR DETERMINING CRYSTALIZATION TEMPERATURE
6 Claims, 2 Drawing Figs.

[52] U.S. Cl. ........................................................ 73/17
[51] Int. Cl. ........................................................ G01n 1/00
[50] Field of Search .............................................. 73/17

[56] References Cited
UNITED STATES PATENTS
| | | | |
|---|---|---|---|
| 2,885,885 | 5/1959 | Lupfer et al. | 73/17 |
| 2,997,874 | 8/1961 | Billuris et al. | 73/17X |
| 3,143,876 | 8/1964 | Wallgren | 73/17 |

Primary Examiner—Richard C. Queisser
Assistant Examiner—John K. Lunsford
Attorneys—Neal E. Willis, J. E. Maurer and William H. Duffey

ABSTRACT: Method and apparatus for automatically determining the crystallization temperature of a flowing liquid. Temperature control means are adapted to vary the liquid viscosity within a crystallization zone. Changes in flow or pressure drop caused by the viscosity changes provide the basis for temperature control. Because operation of the system is cyclic, the effects of heat of crystallization of the liquid can be observed on a recording of crystallization zone temperature, thus identifying the crystallization temperature.

Patented May 4, 1971

3,577,765

INVENTORS
JOSEPH BERTOGLIO
PHILIP L. DEMING
JOYCE G. ECKERT
JAMES R. SHAFER

BY *William H. Duffey*
ATTORNEY

APPARATUS FOR DETERMINING CRYSTALIZATION TEMPERATURE

This invention broadly relates to the determination of the crystallization temperature of a substance. More specifically, it relates to a method and an apparatus for automatic determination of the crystallization temperature of a liquid or solution in a process stream.

Crystallization can be defined as the precipitation of solid material from solution. The mechanism of this process is very complex because it involves the phenomena of diffusion, formation of nuclei, and crystal growth, all of which can take place simultaneously.

A pure liquid on being cooled experiences a decrease in the average translational energy of its molecules, hence its temperature drops until the freezing point is reached. At the freezing temperature the attractive forces of the molecules are sufficient to overcome the translational energy, and the molecules are forced to arrange themselves in a geometric pattern which is characteristic for each substance. When crystallization begins, heat is evolved in an amount equal to the difference in heat content between solid and liquid, this difference being termed the heat of crystallization. This heat evolution arrests further temperature drop and the temperature of the mixture of solid and liquid remains constant as long as both phases are present. Further removal of heat merely results in the crystallization of more liquid, until finally the whole mass solidifies. Only then does the temperature begin to fall again on cooling.

The freezing temperature, or the temperature at which solid and liquid are in equilibrium, is constant and definite for each substance. This temperature has proven very useful in the chemical arts as an indicator of certain physical properties. For example, the freezing temperature of a chemical compound is commonly employed to determine the purity of that compound. The freezing temperature is also useful to determine concentration of a chemical compound within a solution.

The crystallization temperature of a substance is quantitatively the same as the freezing temperature. Crystallization is usually initiated by the formation of crystal nuclei within the liquid around which the crystals grow and develop. Most liquids have a tendency to supercool, i.e., to be cooled below the freezing temperature, before visible crystal formation sets in. This is especially true when the cooling is rapid. When optical means are employed to visually determine the onset of crystallization, therefore, an erroneous reading of freezing temperature may result. To prevent supercooling and to facilitate the formation of nuclei for crystallization temperature determination through optical detection, it is usually advantageous to cool the liquid slowly, stir vigorously, and "seed" the liquid. Seeding involves the addition of a small quantity of the crystals to be formed to act as nuclei. Once crystallization starts, the mass will return to its equilibrium temperature and remain there until crystallization is complete.

When a chemical compound or solution is flowing within a process stream, difficulties arise in the sampling of the stream for determination of crystallization temperature. Mechanical problems and problems of accuracy often make it impractical, if not impossible, to automatically monitor the crystallization temperature of a flowing compound or solution. High pressures and high temperatures within a process stream preclude the use of conventional instrumentation in many situations.

Because of the automatic measurement difficulties recited above, crystallization temperature in a process stream is usually measured on a batch basis by random sampling. Many solutions, upon cooling, reach a point at which one component crystallizes. Determination of the concentration of this component can be made in the laboratory on a drawn sample by collecting and weighing the amount separated, assuming that the remainder of the solution is saturated with that component, or by supercooling and observing by optical means the quantity of crystals formed or the temperature at which they are formed. The optical method, however, is often unreliable for the reasons hereinbefore enumerated.

Certain chemical solutions exhibit a sharp increase in viscosity at the crystallization temperature. One example is an aqueous solution of sodium benzene sulfonate which is formed as a step in the caustic fusion process for the manufacture of phenol. Although numerous viscosity measuring procedures are known to the art, these are not adaptable to all chemical processes. For example, the pressure evaporation of the sodium benzene sulfonate solution in the phenol manufacturing process is accomplished under a system pressure of 85 to 95 p.s.i.g. and a solution temperature of approximately 180° C. Conventional viscosity equipment is usually not adaptable to such high pressures and temperatures. Consequently, crystallization temperature determinations based upon viscosity changes cannot be readily determined under such complex conditions.

Another problem which arises with the sodium benzene sulfonate solution exemplified above concerns the narrow spread between the crystallization temperature and the boiling point of the solution, which varies within the range of 10° C. to 15° C. The attendant control requirements are extraordinarily difficult.

Prior to the outstanding contributions of the present invention, a random sampling system was necessarily employed in determining the crystallization temperature of an aqueous solution such as the sodium benzene sulfonate solution exemplified above. The disadvantages of a random sampling system are numerous. For example, important time is lost in transferring a sample from a process stream tap to the laboratory for determination of crystallization temperature. Errors are often introduced during handling and during exposure to impurities and contamination. The level of quality control is less than optimum because of the practical limit in the number of samplings which can be made. Ideally, therefore, a continuous and automatic determination of crystallization temperature within the process stream is needed for production operations. The disadvantages of a random sampling system are usually reflected in diminished yield from the chemical process.

The present invention provides a method and an apparatus for automatically following and recording the crystallization temperature of a process stream. Broadly stated, the system comprises a crystallization zone wherein the temperature is controlled by sensing the effects of viscosity changes in that zone. Operation of the system is cyclic, thus allowing the effects of heat of crystallization to be detected from a recording of crystallization zone temperature. The facility herein for detecting effects of heat of crystallization assures the accuracy of crystallization temperature determinations. There is no reliance on visual detection of crystal formation and the effects of supercooling are inconsequential to the effectiveness of the measuring system of the present invention.

It is an object of the present invention, therefore, to provide a novel means and method of automatically tracking the crystallization temperature in a process stream for determination of concentration, purity, and the like.

Another object of the present invention is to provide a temperature controlled crystallization zone responsive to viscosity changes in the fluid flowing therethrough and wherein the heat of crystallization can be detected.

A further object of this invention is to overcome the inaccuracies and difficulties inherent in a random sampling system for determination of crystallization temperature.

Still another object of the present invention is to provide a crystallization temperature monitor having outstanding repeatability.

Yet another object of the present invention is to provide a crystallization temperature monitor which is readily adaptable to automatic control.

Other aspects, objects and advantages of this invention will be apparent from a consideration of the accompanying disclosure and drawing, and from the appended claims.

In the Drawing

Figure 1:
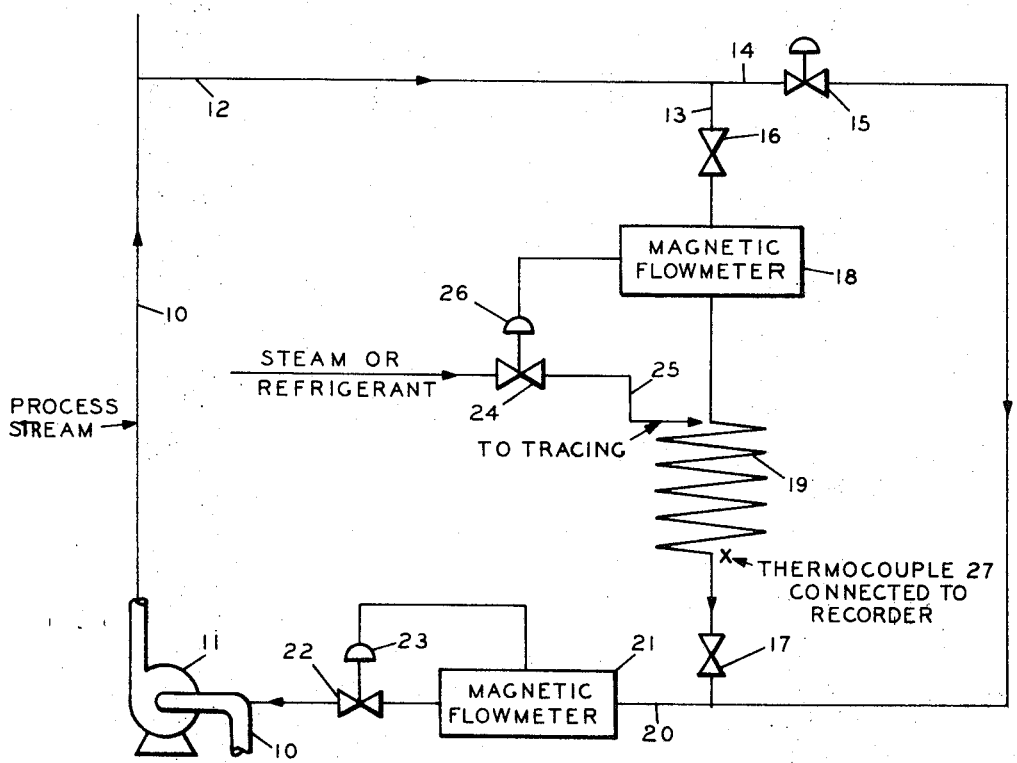
FIG. 1 is a schematic view of an apparatus for automatically determining crystallization temperature within a process stream.

Referring now to FIG. 1 of the drawing, the process stream line is indicated by reference numeral 10. In the embodiment described herein, the process stream fluid is an aqueous solution of sodium benzene sulfonate, but the invention is not limited thereto. Flow of the process stream is maintained by pump 11 which is disposed within line 10. Sidestream flow to the crystallization temperature apparatus is introduced through inlet line 12 and is permitted to flow through measuring line 13 and bypass line 14. The division of flow between lines 13 and 14 is dependent upon the setting of bypass valve 15 which is disposed in bypass line 14. Valve 15 affords vernier control of the flow through the crystallization zone, i.e., through line 13. Isolation valves 16 and 17 are disposed in line 13 to permit shutoff of the crystallization zone when so required.

With continued reference to FIG. 1, that portion of sidestream flow which enters line 13 passes through magnetic flowmeter 18, a device which generates an electrical signal proportional to the rate of fluid flowing therethrough. After discharging from flowmeter 18, the sidestream flow is directed through a coil of process tubing identified by reference numeral 19, and is then directed through outlet line 20 by way of magnetic flowmeter 21 and system control valve 22 on its return to the process stream. Valve 22 affords control of the overall sidestream flow rate. This control is accomplished automatically by coordinating the output signal from magnetic flowmeter 21 with controller 23 of valve 22.

Again referring to FIG. 1 of the drawing, it will be observed that a heat transfer fluid such as steam or a refrigerant is introduced to the crystallization zone through control valve 24 and tracing supply line 25 to afford temperature regulation. Where the process stream fluid is an aqueous solution of sodium benzene sulfonate, steam is an effective heat transfer medium. Steam tracing, for example in the form of copper tubing, is brazed not only to the process tubing of coil 19, but also to the sections of tubing upstream and downstream of coil 19. Steam tracing for flowmeter 18 is provided by a copper or stainless steel tube disposed concentrically with respect to the flow passage through the flowmeter. Control valve 24, therefore, regulates the quantity of steam admitted to tracing supply line 25, and accordingly, to coil 19. The setting of control valve 24 is determined by the electrical signal from flowmeter 18. This signal is coordinated with controller mechanism 26 of valve 24.

Operation of the crystallization temperature system illustrated schematically in FIG. 1 is described as follows. Process stream liquid from line 10 is diverted to the measuring apparatus through inlet line 12. The rate of sidestream flow is determined by control valve 22 which is responsive to the programmed output signal of flowmeter 21 in the discharge section of the apparatus. In the sodium benzene sulfonate solution exemplified herein, a sidestream flow rate of 0.5 gallons per minute is satisfactory. With little or no steam applied to the tracing on coil 19, the test solution flowing in line 13 approaches the viscous stage, thus reducing the rate of flow. The output signal from flowmeter 18 is thereby reduced in its communication with steam control valve 24. The set point on controller 26 of valve 24 is preadjusted to a determined setting, e.g., 0.3 gallons per minute. Thus, when the flow rate through coil 19 decreases to 0.3 gallons per minute because of increased viscosity, steam valve 24 is automatically caused to move to the fully opened position. The test solution has reached a slushy condition but the rapid introduction of steam to the tracing quickly decreases the test solution viscosity. Thereupon, the flow rate is restored to the initial rate of 0.5 gallons per minute. When the initial rate is restored, the output signal from flowmeter 18 causes control valve 24 to go fully closed, thus shutting off steam to the tracings. A measuring cycle is thereupon completed.

Control of the apparatus of FIG. 1 is such as to allow the test solution to reach the crystallization temperature in coil 19 without causing the flow to stop. Thermocouple 27 is affixed to the tar tracing on the downstream or coolest part of coil 19 and is electrically connected to a recording device such as a recording potentiometer. Thus, a continuous recording of solution temperature in the measuring zone is available to the process operator.

Figure 2:
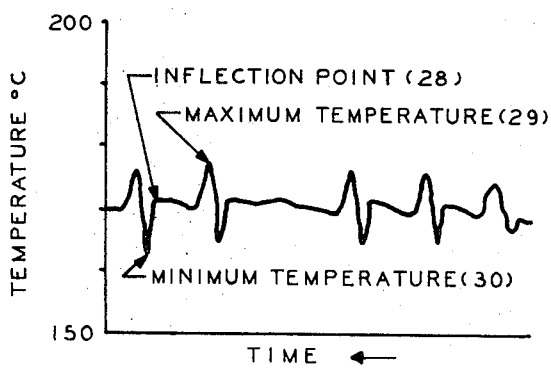
FIG. 2 is a typical recorder tracing derived from the apparatus of FIG. 1, illustrating variations in crystallization zone temperature for a sodium benzene sulfonate solution.

FIG. 2 of the drawing illustrates a typical portion of a continuous temperature recording obtained during crystallization temperature measurements of an aqueous solution of sodium benzene sulfonate. This recording was obtained from the apparatus of the present invention as hereinbefore described. Visual inspection of this recording provides to the operator the necessary information for rapid determination of crystallization temperature. This is illustrated by reference to FIG. 2 wherein the inflection points on the recording illustrated typically by reference numeral 28 signify a temperature change caused by the heat of crystallization. As hereinbefore stated, the ability to detect the heat of crystallization provides an immediate indication of crystallization temperature. Thus, a process operator, by merely reading the temperature scale at the inflection point 28, has a direct measurement of crystallization temperature. The maximum temperature points typified by reference numeral 29 are irrelevant herein to the measurement of crystallization temperature. These peaks represent temperature overshoot in the system when steam is cut off from the tracing of coil 19 during each cycle. Similarly, the minimum temperature points on the recording of FIG. 2, illustrated typically by reference numeral 30, are characteristic of the system when steam is introduced to the tracing of coil 19 during the cycle.

With further reference to FIG. 2 of the drawing, it can be observed that the numerical value of crystallization temperature of the sodium benzene sulfonate solution is approximately 170° C. while the maximum and minimum temperatures are about 175° C. and 165° C., respectively. The temperature excursions in the measuring zone, therefore, are relatively minor. This is advantageous because the boiling temperature of the solution is within 10° C. to 15° C. of the crystallization temperature.

The critical variable being sought in using the method and apparatus of the present invention is crystallization temperature. The facility to distinguish the crystallization temperature through automatic recording means is directly attributable to graphic exhibition of the heat of crystallization. Because of the heat of crystallization is signified on the recording by an inflection point in each cycle as illustrated by reference numeral 28 in FIG. 2, the crystallization temperature can be accurately and rapidly ascertained. Were it not for inflection point 28, the operator would be unable to determine crystallization temperature with such a degree of precision in an automatic test system.

In a sodium benzene sulfonate solution such as hereinbefore described, the crystallization temperature data is used as an indication of salt concentration in the solution. It is further employed to indicate to the system operator that the pressure evaporation process is being carried out at the desired temperature.

In a preferred embodiment of the apparatus illustrated schematically in FIG. 1, coil 19 is made of ⅜-inch stainless steel tubing having a coil diameter of approximately 9 inches and having 9 coil turns. The steam tracing affixed tangentially to coil 19 can be, for example ¼-inch copper tubing. At a flow rate of 0.5 gallons per minute in this embodiment, the residence time of the test solution within coil 19 is approximately 12 seconds.

It will be readily apparent to those skilled in the art that the means and method of the present invention have wide application. This invention permits automatic readout and control of crystallization point in any system of apparatus where crystallization point data has significance. The present invention is not restricted to fluids having high crystallization points. Where the crystallization point is below room temperature, for example, the same system would be employed with the exception that refrigeration would be applied to the coil tracing to attain crystallization.

Although the preferred embodiment of the present invention detects viscosity changes in the measuring zone by observing changes in rate of fluid flow, there are other means of detecting viscosity changes. For example, an alternate embodiment of the illustrated apparatus which senses changes in pressure drop across the coil has been satisfactorily employed for measurement of crystallization temperature. An increase in pressure drop indicates that crystallization is proceeding and a recording of temperature will again show crystallization temperature at the heat of crystallization inflection point. To avoid inadvertent failure of the viscosity sensing instrumentation due to crystalline formations, however, it is advantageous to introduce steam thereto as in the preferred embodiment herein.

While this invention has been described with respect to certain specific embodiments, it is not so limited, and it is to be understood that variations and modifications thereof may be made without departing from the spirit or scope of the following claims.

The embodiments of this invention in which an exclusive property or privilege is claimed are defined as follows:

We claim:

1. Apparatus for determining the crystallization temperature of a flowing liquid comprising:
   a. conduit means adapted to house said flowing liquid;
   b. viscosity sensing means responsive to viscosity changes within said conduit means;
   c. liquid temperature control means cooperating with said viscosity sensing means; and
   d. temperature indicating means adapted to monitor crystallization zone temperature.

2. Apparatus for determining the crystallization temperature of a flowing liquid comprising:
   a. conduit means adapted to house said flowing liquid;
   b. a crystallization member within said conduit means;
   c. viscosity sensing means responsive to viscosity changes within said crystallization member;
   d. liquid temperature control means cooperating with said viscosity sensing means; and
   e. temperature indicating means adapted to monitor crystallization zone temperature.

3. Apparatus for determining the crystallization temperature of a flowing liquid comprising:
   a. a sidestream conduit communicating with a process stream;
   b. sidestream flow control means within said conduit;
   c. a crystallization member within said conduit;
   d. viscosity sensing means responsive to viscosity changes within said crystallization member;
   e. liquid temperature control means cooperating with said viscosity sensing means; and
   f. temperature indicating means adapted to monitor crystallization zone temperature.

4. An apparatus of claim 1 wherein the viscosity sensing means is a flowmeter.

5. An apparatus of claim 1 wherein the viscosity sensing means is a differential pressure meter.

6. An apparatus of claim 2 wherein the crystallization member is a coil of temperature controlled tubing.